United States Patent [19]

Becker et al.

[11] Patent Number: 4,978,266
[45] Date of Patent: Dec. 18, 1990

[54] FASTENING ELEMENT WITH EXPANDING SLEEVE

[75] Inventors: Klaus Becker; Rüdiger Ostholt, both of Wetter, Fed. Rep. of Germany

[73] Assignee: Mannesmann Aktiengesellschaft, Düsseldorf, Fed. Rep. of Germany

[21] Appl. No.: 340,991

[22] Filed: Apr. 20, 1989

[30] Foreign Application Priority Data

Apr. 20, 1988 [DE] Fed. Rep. of Germany ....... 3813892

[51] Int. Cl.⁵ .............................................. F16B 13/06
[52] U.S. Cl. ........................................ 411/61; 411/41; 411/508; 411/913
[58] Field of Search ..................... 411/41, 45, 60, 61, 411/508-510, 913, 182, 108, 46, 47, 48

[56] References Cited

U.S. PATENT DOCUMENTS

| 1,862,152 | 6/1932 | Lee . | |
| 1,889,807 | 12/1932 | Lee . | |
| 2,555,292 | 5/1951 | Poupitch | 411/508 |
| 3,217,584 | 11/1965 | Amesbury | 411/913 |
| 3,710,674 | 1/1973 | Tabor . | |
| 4,133,245 | 1/1979 | Ruihley et al. | 411/913 |
| 4,250,732 | 2/1981 | Moryl | 411/108 |

FOREIGN PATENT DOCUMENTS

| 2242981 | 3/1974 | Fed. Rep. of Germany | 411/41 |
| 7708798 | 7/1977 | Fed. Rep. of Germany . | |
| 2714503 | 10/1978 | Fed. Rep. of Germany . | |
| 3140861 | 4/1983 | Fed. Rep. of Germany . | |

Primary Examiner—Neill R. Wilson
Attorney, Agent, or Firm—Nils H. Ljungman & Associates

[57] ABSTRACT

A fastening element particularly adapted for use in conjunction with a mandrel for opening the expandable sleeve of the fastening element into secure relationship with a wall having a hole into which the fastening element is inserted. The sleeve is designed to provide a radial channel for enveloping the plate member adjacent the hole. The mandrel becomes a part of the fastener and offers good resistance to shear forces and also provides the means for removing the fastening element as well as fixing it to the object to be fastened.

18 Claims, 1 Drawing Sheet

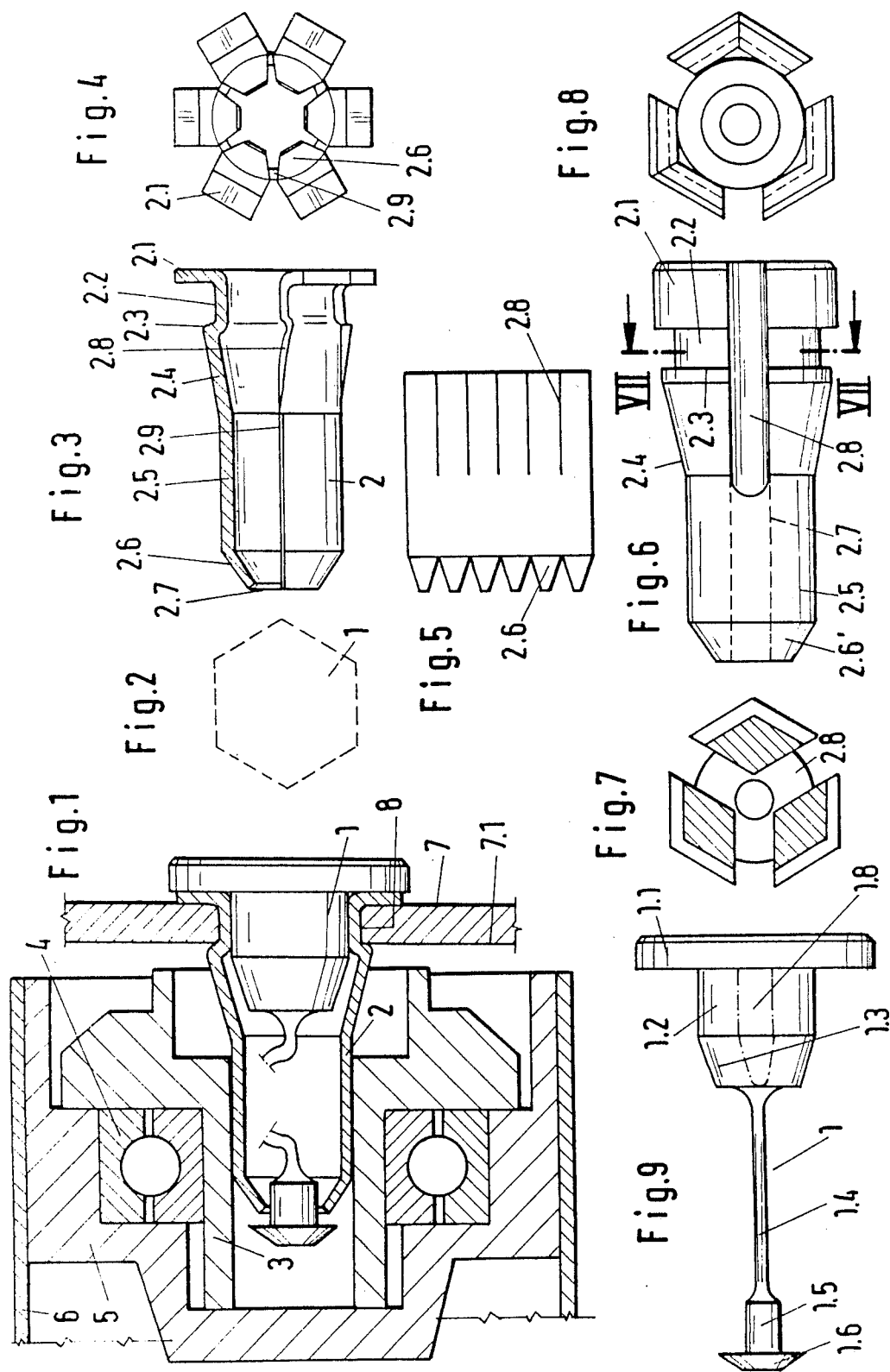

FASTENING ELEMENT WITH EXPANDING SLEEVE

BACKGROUND OF THE INVENTION

1. Field of the Invention

This invention relates to fastening elements and fasteners and, more particularly, to these fastening elements which are used in conjunction with a mandrel and which are insertable into preformed holes.

2. Description of the Prior Art

Such fastening elements are used in the prior art as expanding mandrels to be inserted in masonry holes, as, for example, are disclosed in German Utility Model Specification No. 78 14 794 for fastening elements to a plate. These elements suffer from the disadvantage that they are only capable of withstanding shear stresses to a limited extent.

OBJECT OF THE INVENTION

The object of the invention is the design of a fastening element of the type described above so that a bending stress can safely be applied to the part projecting through a plate without shearing.

Another object is the provision of such shear-resistant fastening elements which are economically manufactured, easily installed and removable in all positions without requiring special tools.

SUMMARY OF THE INVENTION

To accomplish the above objects, the fastening element of this invention is used in conjunction with a mandrel and is designed to be inserted in preformed hole in a plate or other wall member; e.g., a roller conveyor. The fastening element comprises an expandable sleeve. On one end it has a radial channel into which the plate member can nest snugly or by means of a force fit. That is, the axial dimension of the radial channel is substantially equal to the thickness of the plate (or the longitudinal dimension of the hole). The open edge of each side member of the channel has a diameter that is larger than the diameter of the hole thereby providing detents on both sides of the plate, thus preventing lateral movement.

In other words, this is accomplished by an expanding sleeve which, when expanded, is in contact by means of its inside edge on the inside wall of the plate, whereby the distance between the cantilever and the inside edge is equal or substantially equal to the thickness of the plate. Together with the cantilever in contact with the outside wall of the plate, the inside edge of the expanding sleeve, in contact with the inside wall and after the expanding mandrel has been pounded in, forms a fastening which is so stable that bending stresses can be applied to the expanding sleeve just like a cantilever beam.

In another embodiment of the invention, the expanding mandrel is in contact by means of a head with the cantilever of the expanding sleeve that has a sloped region which expands in the direction of insertion in front of the inside edge. Ahead of that, there is a cylindrical portion or region on which the load to be supported can be applied. The head of the expanding mandrel is used for grasping during removal from the expanding sleeve. The sleeve may be advantageously fabricated from plastic; e.g., a solid thermoplastic material which is provided with recesses for receipt of expansion lugs on the expanding mandrel. The mandrel presses the expanding sleeve by means of its contact area against the inner surface of the hole in the plate and for that purpose has an oversize, which is 0.05 to 0.5 mm, depending on the size of the expanding element and the hardness of the material.

In another form of the invention, the expanding sleeve can be made of metal in the form of a sheet metal strip, which preferably has three recesses and, advantageously, five recesses. When coiled on a mandrel in the non-recessed segment, this sheet metal part acquires a cylindrical region, to which the recessed portion is adjacent by means of a hexagon with a conical region, the inside wall area, the contact area and the cantilever. The edges of the sheet metal part form a slot.

The expanding mandrel may be made of plastic or metal. It has a tip in the shape of a truncated cone, the truncated end of which has a larger diameter than the adjacent cylindrical contact portion, to prevent unintentional slipping and a better lock or fastening. At the tip, the expanding mandrel also has a filamentous connecting element to a throat with a head, by means of which the expanding sleeve can be extracted from the plate, even over the mandrel. For pre-assembly, the head is placed in front of the opening at the tip of the expanding sleeve, and the filament is guided through the slot between the edges of the sheet metal strip inside the expanding sleeve. The fastening elements in accordance with the invention can, for appropriate applications, also support bearings in conveyor tracks. They can be readily serviced and the support rollers can be easily inspected.

BRIEF DESCRIPTION OF THE DRAWINGS

Several embodiments within the scope of the invention are illustrated in the accompanying drawing and are explained in greater detail below.

FIG. 1 shows one embodiment of a fastening element in a conveyor track support roller;

FIG. 2 shows a side view of FIG. 1;

FIG. 3 shows metal expanding sleeve in a side view and in longitudinal section;

FIG. 4 shows a side view of FIG. 3;

FIG. 5 shows a coil of the fastening element in FIG. 3;

FIG. 6 shows a plastic expanding sleeve in a side view;

FIG. 7 is a section along VII—VII in FIG. 5; and

FIG. 8 is a side view of FIG. 6, while FIG. 9 is a side view of an expanding mandrel.

DESCRIPTION OF THE PREFERRED EMBODIMENT

FIG. 1 shows the end of a conveyor track support roller 6, which has a roller set 5, and is thereby supported by means of bearings 4 and a retaining element 3 on an expanding sleeve, whose contact area 2.2 is pressed by an expanding mandrel 1 against the wall of a hole 8 in a plate 7 or side panel. When the expanding sleeve used is made of metal, the bleeder resistance to reduce electrostatic charges is less than 10 Mio Ohm. These electrostatic charges can originate when the roller is turned and must be bled off as much as possible. If the side panels have been painted before assembly, the paint in the area of the hole will be chipped off when the metal expanding sleeve is pounded in. Thus, there will be a complete electrical connection between the expanding sleeve and the side panel.

The expanding sleeve 2 illustrated in FIGS. 1 and 3 is made of sheet metal approximately 1 mm thick, which is shown coiled in FIG. 5. On one end it has five recesses 2.8 and on the other end five sharp projections or edge sections, so that the part remaining between them, after coiling, forms a truncated pyramid 2.6. The non-recessed area 2.5 becomes cylindrical when rolled, and the recessed portion initially forms a sloped portion or region 2.4, the diameter of which increases, with an inside edge 2.3 beveled toward the mandrel, which is adjacent to a hexagonal contact region 2.2 for the hole 8 with beveled cantilever regions 2.1.

The expanding mandrel 1 illustrated in FIG. 9 is pounded into this expanding sleeve 2. For the expansion of the contact area 2.2 of the expanding sleeve 2, it has a truncated cone 1.3 with a contacting member 1.2 and a head 1.1. So that the expanding mandrel cannot inadvertently slip out of the expanding sleeve 2, the maximum diameter of the truncated cone 1.3 is approximately 0.2 mm larger than the diameter of the contacting area 1.2. Adjacent to the truncated cone 1.3 is the filamentous connecting element 1.4 with a cylindrical throat 1.5, which is held in the tip 2.6 of the truncated cone.

To remove the expanding sleeve, first the expanding mandrel 1 is grasped at its grip 1.1 and pulled back, whereby the connecting element 1.4, which is curved in FIG. 1, is stretched out. The expanding mandrel 1 can then be grasped firmly by the head 1.1 and by means of the connecting element 1.4 and the head 1.1, the expanding sleeve 2 can be extracted from the hole 8.

For certain applications, expanding sleeves made of plastic may also be used effectively, as illustrated in FIGS. 6 to 8. This expanding sleeve 2 is in contact by means of a cantilever 2.1 from outside with the plate 7 or side panel, and with a cylindrical or hexagonal contact area 2.2 fills up the hole 8, and is in contact by means of the inside edge 2.3 against the inside wall 7.1. The expanding sleeve 2 is compressed during insertion into the hole 8 by means of the sloped region 2.4, whereby the three recesses 2.8 visible in FIGS. 6 and 7 are narrowed. This expanding sleeve also has a cylindrical region 2.5 to support the retaining element 3 as well as a longer opening 2.7 to allow passage of the connecting element 1.4 of the expanding mandrel 1 with a pointed head 1.6, which lies ahead of the truncated cone 2.5. Expansion lugs 1.8 of the expansion mandrel 1 project into the recesses 2.6. One of these expansion lugs 1.8 is illustrated in dotted lines in FIG. 9.

In summing up, an embodiment of the invention resides in a fastening element with an expanding sleeve 2 which can be inserted in a hole in a plate, has slits 2.8 and can be expanded by an expanding mandrel 1 which can be inserted into it. The expanding sleeve is in contact with a cantilever 2.1 on the outside edge of the hole 8 or the outside of the wall of the plate 7. The distance between the cantilever 2.1 and the inside edge 2.3 is equal to the thickness of the plate 7, and additionally the contact region 2.2 of the sleeve on the edge of the hole is cylindrical, adjacent to which, in the direction of the forward edge of the sleeve, is a tapered region 2.4. Adjacent to that, a cylindrical region 2.5 is characterized by the fact that the mandrel 1 is made of hard plastic and has a tip 1.3 in the form of a truncated cone, and is in contact with a cylindrical contact region 1.2 on the contact region 2.2 of the sleeve 2. The thick end of the truncated cone 1.3 has a slightly larger diameter than the contact region 1.2 of the mandrel 1. On the cylindrical region 2.5, there is a retaining element 3 for a conveyor track support roller 6, and that the plate 7, with the hole 8, is a side panel of a conveyor track.

Another aspect of the invention resides in that the expanding mandrel 1 is in contact by means of its head 1.1. with the cantilever 2.1 of the expanding sleeve.

Yet still another aspect of the invention resides in that the expanding sleeve 2, in front of the inside edge 2.3, has a sloped region which expands in the direction of insertion, and ahead of that, a cylindrical region.

And yet another aspect of the invention resides in that the expanding sleeve 2 is fabricated from a solid thermoplastic material. The expanding mandrel 1 projects by means of expanding lugs 1.8 into recesses 2.8 of the expanding sleeve 2.

A still further aspect of the invention resides in that there are three recesses 2.8 and expanding lugs 1.8.

And still yet another aspect of the invention resides in that the expanding sleeve 2 is fabricated of metal.

A further aspect of the invention resides in that the expanding sleeve 2 is fabricated from a piece of sheet metal and has several recesses 2.8, which extend from the cylindrical region 2.5 to the cantilever 2.1. The segments between the recesses 2.8 form the sloped region 2.4, the inside edge 2.3, contact area 2.2 and the cantilever 2.1.

A still further aspect of the invention resides in that the expanding sleeve 2 has five recesses 2.8.

And still yet another aspect of the invention resides in that the expanding mandrel 1 is fabricated from hard plastic, has a tip 1.3 in the shape of a truncated cone, and is in contact by means of a cylindrical contact region 1.2 with the contact region 2.2. of the expanding sleeve 2. The thick end of the truncated cone 1.3 has a somewhat larger diameter than the contact region 1.2 of the expanding mandrel 1.

And still yet a further aspect of the invention resides in that the expanding mandrel has, on its tip, a filamentous connecting element 1.4 for a throat 1.5 in contact from the inside of the tip of the truncated cone 2.6 of the expanding sleeve 2. The connection element 1.4 projects by means of a head 1.6 through an opening 2.7 of the tip in the shape of a truncated cone.

And yet another aspect of the invention resides in that on the cylindrical area 2.5 there is a retaining element 3 for a conveyor track support roller 6, and that the plate 7 with the hole 8 is a side panel of a conveyor track.

The invention as described hereinabove in the context of preferred embodiments is not to be taken as limited to all of the provided details thereof, since modifications and variations thereof may be made without departing from the spirit and scope of the invention.

What is claimed is:

1. A shear-resistant fastener which is insertable into the hole of a member to which is attachable comprising:
   an expandable sleeve having, at one end, a radial channel portion, the open edges of which each have a diameter larger than the hole into which it is to be inserted and an axial dimension which is substantially equal to the thickness of the member to which it is attachable;
   a mandrel having a head for being in contact with one edge of the radial portion of the sleeve, said mandrel for expanding the sleeve;
   said mandrel comprising;

a sleeve expansion member, depending from said head for contacting an axial portion of the radial channel portion; and a cone member, the base of the cone being affixed to and axially aligned with the sleeve expansion member; said cone member comprising a truncated cone;

wherein the mandrel has, leading from its truncated cone, a resilient filamentous connecting element contacting that part of the sleeve which is remote from the radial channel;

said resilient filamentous connecting element having a filamentous portion comprising a thread member.

2. A fastening element according to claim 1, wherein the sleeve is provided with a cylindrical portion attached to a sloped portion connected to the radial portion; said slope portion being expandable in the direction of insertion of the element into the hole.

3. A fastening element according to claim 1, wherein the sleeve has recesses extending from the cylindrical portion to the radial channel portion.

4. A fastening element according to claim 1, wherein the radial channel fits snugly with the member to which it is attachable.

5. A fastening element according to claim 1, wherein the radial channel force fits with the member to which it is attachable.

6. A fastening element according to claim 1, wherein the sleeve is fabricated from a material selected from the group consisting of plastics and metal.

7. A shear resistant fastener according to claim 5, wherein said mandrel is constructed from a plastic material.

8. A shear resistant fastener according to claim 7, wherein said expandable sleeve is constructed from a thermoplastic material.

9. A shear resistant fastener according to claim 5, wherein said expandable sleeve is constructed from a metallic material.

10. A shear resistant fastener according to claim 5, wherein said expandable sleeve includes at least five said recesses.

11. A fastening element according to claim 1, wherein the sleeve is made of sheet metal.

12. A fastening element according to claim 6, wherein the bleeder resistance of the metal sleeve is less than 10 Mio Ohm.

13. A fastening element according to claim 7, wherein there are 5 recesses.

14. A shear-resistant fastener according to claim 1, wherein the base of the truncated cone is larger than the diameter of the sleeve expansion member.

15. A shear-resistant fastener according to claim 1, wherein the sleeve is provided with a cylindrical portion connected by a sloping portion with the radial channel;

said sleeve having recesses extending from the cylindrical portion to the radial channel and said mandrel having expansion lugs extending into said recesses.

16. A shear-resistant fastener which is insertable into the hole of a member to which is attachable comprising:

an expandable sleeve having, at one end, a radial channel portion, the open edges of which each have a diameter larger than the hole into which it is to be inserted and the axial dimension of which is substantially equal to the thickness of the member to which it is attachable;

an expanding mandrel having a head in contact with one edge of the radial portion of the sleeve;

a sleeve expansion member depending from said head and contacting the axial portion of the radial channel and a cone member, the base of which is affixed to and axially aligned with the contacting member; and wherein the mandrel has, leading from its truncated cone, a resilient filamentous connecting element contacting that part of the sleeve which is remote from the radial channel.

17. A shear resistant fastener according to claim 1, wherein said mandrel includes expanding lugs for being projected within said expandable sleeve.

18. A shear-resistant fastener which is insertable into the hole of a member to which is attachable comprising:

an expandable sleeve having, at one end, a radial channel portion, the open edges of which each have a diameter larger than the hole into which it is to be inserted and an axial dimension of which is substantially equal to the thickness of the member to which it is attachable;

a mandrel having a head for being in contact with one edge of the radial portion of the sleeve, said mandrel for expanding the sleeve;

said mandrel comprising;

a sleeve expansion member, depending from said head for contacting an axial portion of the radial channel portion; and a cone member, the base of the cone being affixed to and axially aligned with the sleeve expansion member; said cone member comprising a truncated cone;

wherein the mandrel has, leading from its truncated cone, a resilient filamentous connecting element contacting that part of the sleeve which is remote from the radial channel.

* * * * *